3,364,676
POWER PRODUCTION SOLAR ENERGY
CONCENTRATOR
Wendell S. Miller, 1341 Comstock Ave.,
Los Angeles, Calif. 90024
Continuation-in-part of application Ser. No. 214,595,
Aug. 3, 1962. This application Nov. 15, 1965, Ser.
No. 507,747
8 Claims. (Cl. 60—26)

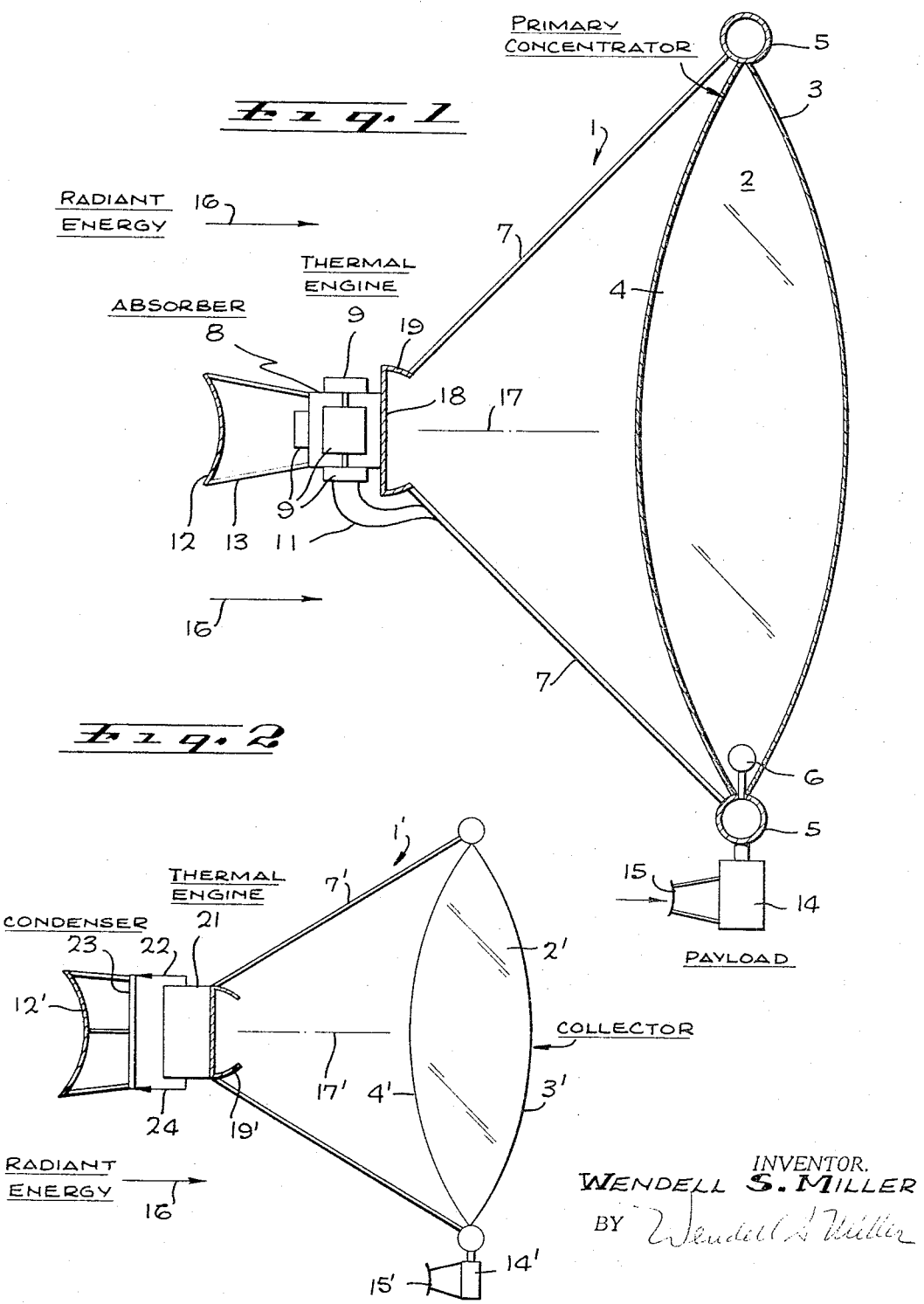

This application is a continuation in part of my co-pending application Serial No. 214,595, filed August 3, 1962 for "Radiation Collecting Devices," now Patent No. 3,217,702.

The invention herein relates to an improved combination utilizing the device of the previous application to enable an efficient use to be made of solar radiation collected with extremely light weight structures for the production of power.

It is well known that solar radiation may be intercepted and converted into electrical power for use in space vehicle. Great numbers of solar cells, in fact, have been used for this purpose. Since such cells are expensive, comparatively heavy, and susceptible to damage by radiation and meteorite encounter, it has been suggested that for large scale power requirements, in excess of a kilowatt, solar powered heat engines of one sort or another offer greater promise. Such heat engines fall roughly into 2 classes, thermoelectric and moving fluid. In the former class may be lumped thermionic emission devices and thermocouples. In the latter class fall the various fluid engines operating on Brayton, Rankin, Erickson, Sterling, cycles etc. In every case ultimate efficiency is limited by the Carnot efficiency corresponding to the obtainable input-output temperatures available to the heat-energy conversion devices.

Since the sun approximates roughly a black body emitting at 6000° K., this is the absolute maximum input temperature available to a heat engine so powered. In practice, of course, the temperatures which must be employed for the input are limited by several other factors, such as: the economic and weight cost of collector optical perfection; the proportion of heat energy collected which the conversion apparatus is designed to intake; and the thermal capability of the materials of construction of the radiation absorber. It is known that a number of governmental contracts have been let in an endeavor to develop light weight solar collecting mirrors of practical perfection and high temperature thermal power generators of both of the classes noted above.

The general theory of operation hereintofore utilized for the design of such structures envisions the production of a mirror of maximum optical perfection consistant with weight, cost, and transported size, together with appropriate orientation means for aligning the axis of such generally paraboloidal mirrors with the direction of the sun and a high temperature absorber adapted to be carefully positioned at the focus of the mirror when unfurled or assembled. In all devices known to the applicant, the mirror-absorber-converter combination is adapted to use a high proportion (approximately 85%) of the radiation falling on the mirror for application to the converter as high temperature heat input. The absorber thus of necessity operates at a much lower temperature than that which it would have in the presence of radiation on the mirror and the absence of the heat withdrawal by the converter. It is to avoid difficulties inherent in the design of apparatus operating on this philosophy that applicant herein teaches a new and different principle of energy conversion operation and apparatus for effecting such principle.

The difficulties inherent in apparatus operating on the earlier principle are easily identified. Since the absorber of necessity views an open radiation receiving region with $2\pi$ steradians of angular extent through the area corresponding to its inlet port, it will radiate into that half space through that port at a rate determined from Stephan's law by its temperature. Such re-radiation, of course, represents heat not used by the conversion apparatus. If this component of heat loss is to be held to a minimum, the size of the port must correspondingly be minimized and thus the optical perfection of the radiation collecting structure must be maximized. To obtain practical perfect collectors, a rigid structure must either be put aloft or formed aloft and several methods of accomplishing this latter operation have been suggested. They are in general expensive and limited in the size of mirror which they can produce. Further a high efficiency of reflection must be obtained from the surface of a mirror so produced in order to obtain a corresponding efficiency in the use of the reflecting area and to prevent the absorption of excessive heat in the mirror surface thereby leading to distortion of the reflective surface and loss of the precision of focus required. Further, and most important, provision must be made for constantly removing from the absorber designed amount of energy in order that the temperature of the absorber may not rise excessively.

If a conventional thermal power system, lacking the subsidiary reflector described in the parent application, were designed to operate at 2100° K. while utilizing 90% of the input radiation from the mirror, and thus remitting through the entrance port 10% of such radiation, the absorber's temperature would rise to 3765° K. if the power withdrawal were cut off. That is to say the temperature of the absorber would rise by a factor equal to the $\sqrt[4]{10}$ in order to increase the reradiation through the entrance port by a factor of 10. In the same configuration, were the power consumption to be reduced by a factor of 20%, a temperature increase from 2100° K. to 2720° K. would be necessitated to stabilize the configuration thermodynamically. This last property of solar collectors of conventional design renders them very vulnerable to a complete destruction upon the occurrence of even temporary and small scale fluctuations in power demand. While 2100° K. is an eminently useful temperature for such conversion apparatus as thermionic emitters, an increase in the temperature of any presently known structure of that type to 2720° K. would result in its immediate and catastrophic destruction. An increase to 3765°. K. in the temperature of any known power production mechanism would surely be fatal to such a device.

There are decided advantages inherent in operating a collector absorber combination as shown here in a mode in which only a small proportion, typically 10%, of a power delivered by the collector to the absorber is actually utilized by the energy converter, the remainder being re-emitted by the absorber. Were the apparatus to be so designed that with full capacity power removal from the absorber by the heat engine, the absorber would operate at 2100° K., even if the removal of heat from the absorber by this converter were to be completely suspended for any reason, the temperature of the absorber would increase by a factor of only $\sqrt[4]{10/9}$ to 2157° K. before the resulting increase in reemission would drain off all of the formerly utilized energy and regain thermal stability. A loss of 20% in the converter utilization would correspondingly raise the absorber temperature by only 15° K. Thus operated in such a low absorber efficiency mode, the system would be free from danger of destruction by inadvertent overheating due to insufficient power drain.

Heretofore it has not been thought practical to endeavor to operate solar power convertors in the low absorber efficiency mode for several reasons. With collectors of high optical perfection, impractically high absorber temperatures would be required for such operation. With collectors of comparatively low optical perfection such as inflated structures produced of metalized polyester film, or similar device retained in paraboloidal form by electrostatic attraction of such film to an attractive grid, other fundamental problems arise. With inflated structures the geometrical temperature, defined below, may very well lie in the vicinity 2100° K. Thus operation of an absorber in the 2000° K. range may not be practical with conventional structures even in the total absence of useful heat withdrawal.

The term geometrical temperature as used herein refers to the effective temperature of a fictitious sun emitting black body radiation of a specific intensity equal to that of the true sun, reduced by the transmittance of an atmosphere, if applicable, the reflection coefficient of the collector mirror surface, and a solid angular coefficient equal to the ratio of the solid angular subtense of the true sun at the point of observation divided by the effective average solid angle apparently occupied by the sun due to geometrical imperfections in the reflector surface. Obviously the first two factors represent an absolute loss of solar flux due to imperfect transmission and reflection. The ratio factor corresponds only to a loss flux density with respect to solid angle and is not actual flux loss. Deviation of this factor from unity merely indicates that the fictitious sun apparently has a larger solid angular size than the true sun and thus gives rise to a larger focal spot for a particular paraboloid geometry. The lower geometrical temperature with an optically imperfect collector structure results only to a small extent from the reduced total flux due to the first two factors. To a greater extent the reduced maximum absorber temperature obtainable traces to the size of the port which acts as a target for the collector. The amount of reemitted radiation is of course directly proportional to the area of this port as well as the fourth power of the absolute temperature maintained by the absorber. With conventional solar collectors, the solid angle available to re-radiation emitting from the absorber port is $2\pi$ steradian, regardless of the nature of the collector structure.

Were it not for the fact that inflated collector structures experience great difficulty in reaching even a geometrical temperature, let alone an absorber temperature approaching that required by high temperature thermal engines, such low efficiency collectors would nevertheless have a great weight and economic advantage over more perfectly fabricated collectors. Inflated structures 100 ft. or more in diameter would inherently weigh and cost less than rigid collectors with 1% of their area.

It is apparent that if means are provided for increasing the absorber temperature obtainable with a low efficiency reflector so that high temperature thermal engines may be powered thereby, such engines operating at as little as 10% collector-absorber efficiency would still provide a power to weight ratio as much as 10 times greater than that of rigid structures while enjoying the benefit of inherent thermal stability first mentioned above.

In the parent application there is described a subsidiary reflector structure adapted for use with solar furnaces which enable such furnaces to produce in their absorbers, temperatures closely approximating the geometrical temperature of the configuration. In effect the subsidiary reflectors occupy as much as practical of the solid angular region exposed to re-radiation from the absorber port which is not of necessity traversed by radiation directed to the port from the collector. This subsidiary reflector is essentially reflexive with respect to radiation emitting from the port, returning substantially all such radiation falling upon it back to the port. Suitable forms for such reflex structures are reflective segmental spheres or oblate spheroids coaxial with the port and the axis of the collector. With an oblate spheroid construction, the focii of the defining ellipse preferentially lie within the area of the port. Another type of reflex reflector adapted to return radiation substantially exclusively to the port consists of an array of totally internally reflective corner reflectors supported in the appropriate solid angle about the absorber port, with the body diagonal of each such reflector passing through the port. Such a reflex reflector is shown similarly conserving radiation flux emitted in unnecessary directions in my copending application Ser. No. 345,227 for "Radiation Source."

The parent application to this was directed at attaining particularly high temperatures, approximating the geometrical temperature of the collector provided. Since the use of the device described therein was directed primarily to thermal test research and production purposes there was included no indication of means for the removal of heat energy for the production of power. In devices of that type the highest absorber temperatures may be obtained by utilizing an absorber entrance port only slightly exceeding in size the focal image produced by the central portion of a paraboloidal collector. With such a port the average specific intensity of the input flux to the port is only slightly smaller than that corresponding to the geometrical temperature of the collector-sun combination. While this configuration produces the highest possible temperature, it is extremely wasteful of flux delivered to the port by the peripheral portions of the collector, and is thus scarcely suitable for power production. Much greater total flux input to the absorber port may be obtained by increasing the diameter of the port to the value only slightly less than the major axis of the elliptical trace in the focal plane produced by a pencil of light from the sun reflected from the peripheral portion of the collector. This diameter of course exceeds that of the central focal diameter by a factor corresponding to the secant of the rim angle, $\Omega$, due to foreshortening, and $2/(1-\cos \Omega)$ due to the increased distance of the periphery of the collector from the focus. In practice the diameter of the absorber port will be adjusted to lie between these two extremes depending on a variety of designed considerations.

For a given collector and absorber port size there may thus be defined another critical temperature, $T_{ta}$ or the thermo-dynamically obtainable temperature of the combination. This is the temperature which would be stably maintained in the absorber radiating through its port only through a solid angle corresponding to the solid angle subtended by the collector at the port. This temperature is of course determined by the ratio of the flux received through the port from the collector to the area of the port times the solid angle there subtended by the collector. In general $T_{ta}$ will equal the geometrical temperature $T_g$ when the port diameter does not exceed the diameter of the centrally produced focal spot. With conventional concentrator geometry the attainable absorber temperature is of course considerably less than $T_{ta}$. This results from the fact that the re-emission from the absorber is throughout the entire $2\pi$ steradians accessable to it and not solely into the solid angle subtended by the collector.

It is well known that for a given size collector mirror the smallest port which will receive all of the flux reflected from the collector will be obtained when the collector rim angle is 45°. At smaller rim angles the increased focal length of the collector increases the focal spot size; and at larger rim angles the perspective elongation of the peripheral pencils dominates. The total flux input to the port increases at a greater rate than the corresponding port size required as the rim angle increases to 45° to 60°. Conventional solar collectors invariably operate with rim angles substantially above 45° and usually approximating 60°. This is true even though such large collector angle necessarily imply absorber temperatures considerably below the $T_{ta}$ possible with a collector of the same state of geometrical perfection and size and an absorber intercepting substantially all of the collected flux. I have found that with the aid of a supplemental reflex reflector it is possible to utilize geometrically imperfect collectors such as inflated paraboloidal balloons to produce substantial useable heat input to a thermal engine at a temperature as high as .85 times the geometrical temperature of the system. This may be accomplished while operating the absorber in a thermally stable mode, immune to catastrophic temperature fluctuations upon loss of power removal capacity. The system is adapted to operation with thermal engines of the thermoelectric, thermionic, and moving fluid varieties.

It is an object of this invention therefore to provide a more efficient light weight solar power collection structure.

Another object is to provide a thermal power production device immune to substantial temperature fluctuations upon removal of power absorption capability in a heat engine.

An object is to provide a means for utilizing a low perfection optical concentrator for operating a heat engine at a considerably higher temperature than has heretofore been possible.

Another object is to provide means for operating a solar power production collector efficiently at a lower rim angle subtense than has heretofore been practical.

Another object is to provide an efficient geometry for the collection of heat for input to a thermal engine and radiation of rejected heat from such engine.

FIGURE 1 exhibits an inflated paraboloidal solar concentrator and heat engine provided with the supplemental optical devices of this invention.

FIGURE 2 exhibits a variational form of the FIGURE 1 device utilizing a moving fluid thermal engine.

In FIGURE 1 there is shown at 1 a solar energy thermal power collection and conversion assembly. The primary concentrator of this assembly 2 is an inflated balloon whose posterior surface 3 is of paraboloidal shape defining an axis 17 and is produced of a light weight metalized material, typically aluminized polyester sheet. The anterior surface 4 of the collector 2 may also be produced of light weight polyester film, in this case transparent. The periphery of the balloon may be supported by an inflated torus 5 of more substantial but still flexible material carrying a controllable source of gas producing material. Since it is contemplated that collectors of this type are adapted to use in an atmosphere-free environment the inflation gas producing source 6 may typically be a body of volatile solid material such as p-dichlorobenzene, with provision for temperature control. It is desirable that the material should have a vapor pressure sufficient to insure that it will remain gaseous at its temperature of the collector surfaces 3 and 4. Ultimately supported on the torus 5 by means of strut 7 is an absorber 8 and a thermal engine 9.

As here illustrated the thermal engine 9 is a set of thermionic emitters whose cathodes are in intimate thermal contact with the interior of absorber 8 and whose anodes are exposed for radiant heat dissipation. Power produced by such thermionic emission heat engines may be conveyed through lines 11 to power consumption apparatus in a payload 14. To protect the heat radiating anodes of the thermionic emitters 9 from undesired direct solar heating a polished reflector structure 12, preferably reflective on both sides, may be supported on secondary strut structure 13 in a position to shade the emitting surfaces of the anodes.

Sensing means 15 are of necessity supplied to enable the direction 16 from which solar flux originates to be determined so that the collector 2 may be oriented with its axis 17 parallel to the direction 16 by means of conventional orientation mechanism, not shown. With the exception of the fact that it has not heretofore been practical to utilize inflated structures as collectors for the operation of heat engines efficiently, the foregoing apparatus may be considered conventional if produced to design specifications different from those taught herein.

To achieve the purposes of this invention, there is of necessity incorporated in the device 1 a subsidiary retro-reflector 19 adapted to return to the entrance port 18 of absorber 8 radiation emitting from entrance port 18 throughout the solid angle not subtended at 18 by the reflective surface 3. Such radiation is of necessity confined to the half space centered on axis 17 and containing collector 2. The retro-reflective structure 19 may typically be a reflective segmental sphere concentric with port 18. Somewhat greater efficiency of return reflection may be obtained by constructing element 19 in the form of an oblate spheroid also centered on port 18 and with the focii of its defining ellipse within, or preferably at diametrically opposed edges of a circular entrance port 18. The retro-reflective structure may also take the form of a sheet of corner reflectors each having its body diagonal intercepting port 18.

The geometry of the collector paraboloid 3 should be so adjusted that the rim angle does not substantially exceed 45° and should be at least 30°. The diameter of entrance port 18 should not exceed 1.6F$\Omega$ for 45° rim angle or 1.25F$\Omega$ for 30° rim angle, but should approximate these values. Appropriate values for the coefficient with other rim angle values may be obtained by quadratic interpolation using a value of 1 for 0° rim angle. In these expressions F is the focal length of the paraboloid defined by reflector 3, and $\Omega$ is the angular subtense in radians of the fictitious sun corresponding to the degree of geometrical perfection of the surface 3. For inflated structures this last term is substantially independent of the apparent size of the true sun and is equal to twice the average angular deviation from the theoretical paraboloid which the actual surface of the reflector 3 makes.

In operation collector 3 will direct through entrance port 18 a flux of such average specific intensity as corresponds to at least .79 $T_g$ for a reflector with 45° rim angle and .95 $T_g$ for a reflector with 30° rim angle. Where $T_g$ is the geometrical temperature of the system. These quantities thus determine the respective $T_{ta}$ of the system.

If the thermal engines 9 are operated at such an input-output temperature differential to result in the withdrawal through the engine of a small fraction, typically 10%, of the energy directed on port 18 by reflector 3 the remaining 90% of such energy will be reradiated from port 18 into the half space centered on axis 17. With a properly formed and polished retro-reflector structure 19, substantially 90% of the radiation from port 18 falling on the structure 19 will be returned to port 18, although none of that which misses the structure 19 will be so returned. The capacity of an angular region for receiving radiation emitted from an aperture is proportional to a quantity, designated exposal in the parent application, determined by the integrated value of the solid angle subtended by elements of the space at the aperture weighted by the Lambert cosine foreshortening factor. Ignoring obscuration by the absorber, etc., with a 45° rim angle the collector and the supplemental retro-reflector each intercept an exposal of .5. With a rim angle of 30° on the collector the exposal to the collector is .25 and that to the retro-reflector .75. Consequently for the 45° geometry and with the absorber operating at a temperature near $T_{ta}$, the retro-reflector will be delivering to the absorber almost as much energy as the collector itself. With the 30° rim angle the retro-reflector will be returning almost 3 times as much radiation as is delivered by the collector. This additional returned energy is very inexpensively obtained in proportion to the effort which would be required either to increase the size of the collector 2 or to increase adequately its optical perfection. While this increase in the total flux entering port 18 is of importance in itself and partially compensates for the inefficiency inherent in operating the absorber in a low power removal mode, a greater advantage is derived from the increase in actual absorber temperature which results from the increase average flux density throughout the exposed half space at the port.

For a 45° rim angle collector and a complementary retro-reflector with effective reflective coefficient .9 the removal of 10% of the input energy for useful power production would leave the absorber at a temperature .94 $T_{ta}$ and the removal of 20% of the input flux would leave the absorber at .925 $T_{ta}$. For a 30° rim angle collector under the same conditions, 10% energy removal would leave the absorber at .915 $T_{ta}$ and 20% flux removal would leave the absorber at .885 $T_{ta}$. In the 45° case $T_{ta}=.79\ T_g$ and in the 30° case $T_{ta}=.95\ T_g$. A simple multiplication of these figures indicates that for the four cases just discussed, the values of the resulting absorber temperatures are, in order, .74 $T_g$, .73 $T_g$, .87 $T_g$, and .84 $T_g$. With this range of values available, it is possible to design the overall system to match the optimum input temperature to the thermal engine to the feasible geometric temperature or optical perfection of the collector.

While the temperature increases with decreasing rim angle utilizing this system, the length of the support strut 7 also increases, quite rapidly below the 30° angle. From here on it is more practical to endeavor to improve the geometrical temperature of the system.

The retro-reflector 19 should be made with as small a radius as possible consistent with the temperature rise which it will necessarily experience due to absorption of the reradiation from port 18. Due to weight considerations, it is contemplated that direct radiation from the radially exterior surface of reflector 19 will suffice to provide cooling of the reflector. For this purpose element 19 may be made of copper with a heavily oxidized exterior surface and a polished silver interior surface to minimize absorption of visible and infrared radiation.

A description of thermionic emitter heat engines of the type contemplated appears in the report "Solar Energy Thermionic Conversion Systems" by W. R. Menetrey and A. Smith, Paper 2499-62 of the American Rocket Society Space Power Systems Conference, September, 1962.

In FIGURE 2 there is shown at 1' an alternate embodiment of the solar power production system. Collector 2' comprising reflector 3' and support member 4' and attached to absorber supporting strut 7', payload 14' and orientation means 15' are essentially the functional equivalent of the corresponding unprimed elements of FIGURE 1. Here however, struts 7' are disposed to present to absorber and thermal engine 21 a rim angle approximating 30° for the collector 2'. Similarly the axis 17' of collector 2' is orientated in operation parallel to the direction 16 of radiant energy from the sun. In this form of the invention there is shown at 21 an element diagramatically representing a moving fluid engine with heat input absorber at the common focus of reflectors 2' and 19' with respect to their particular radiant fluxes. In this form of the device there are of necessity provided conduits 22 and 24 for respectively transmitting fluid from heat engine 21 to heat rejection element or condenser 23 and returning the cooled fluid therebetween. A protective shield 12', preferably silvered on both sides, should be provided to prevent direct solar radiation from reaching the radiant surface of cooling element 23. Any of the various forms of closed cycle external combustion engines known to the art may be employed for element 21.

It is apparent that the devices of either FIGURE 1 or 2 may be operated also in a mode in which the heat engines 9 and 21 respectively withdraw from the absorber a large fraction of the energy input from the collectors 2 or 2'. Under such conditions, of course, a considerably augmented rejection of heat from the heat engines at their low temperature rejectors would be required. In this mode of operation, considered much less satisfactory, the retro-reflectors 19 and 19' would have very little effect on the performance of the system and a compensating inefficiency would appear by virtue of reduced Carnot efficiency in the engine cycle or decreased power handling capacity of emitter surfaces. Consequently, it is found that when the thermal power withdrawal from the absorber exceeds 25% of the input radiant energy the advantages of this system become of little importance.

When used in the manner taught here, the apparatus described provides means for performing a method of power production whereby heat incapable of utilization for power production is rejected at a high temperature from the absorber rather than at a low temperature from the waste heat rejector. The method is applicable to apparatus employing collectors having a concentration ratio insufficient, in the presence of design solar flux, to raise the material of the absorber to a temperature at which thermal damage will occur, even in the complete absence of useful heat withdrawal. It is particularly in conjunction with such concentrators that the first mentioned thermal stability advantage is most pronounced.

While the apparatus of this invention has been described in a form particularly suited to extra-terrestrial usage, it is of course possible to utilize the principles taught herein in ground based apparatus. In such devices the inflated structure of collector 2 may be replaced by other optically imperfect collector configurations better suited to withstand wind, and other apparatus for cooling the low temperature end of the heat engine may be employed.

I claim:

1. The method of producing power from a solar power production system comprising an absorber adapted to absorb and reemit thermal radiation, a heat receiver adapted to transmit and dispose of thermal energy, a heat engine adapted to produce power thermodynamically by the transfer of heat at a first temperature from said absorber to a second lower temperature at said heat receiver, a solar radiation collector adapted to receive and concentrate radiant energy on said absorber, a retro-reflective structure adapted to receive radiation emitted from said absorber and return said radiation to said absorber, orientation means adapted to sense a direction of solar radiation flux and orient said collector with respect thereto, said method comprising:

orienting said collector with respect to said solar radiation flux so as to concentrate said radiation on said absorber, withdrawing from said absorber through said heat engine a positive amount of thermal energy at a rate not exceeding 25% of the rate of total thermal energy input to said absorber, discharging heat from said thermal engine to said heat receiving structure, producing power from said transfer of heat between absorber and heat receiving structure, reflecting from said retro-reflecting structure back to said absorber thermal energy reemission from said absorber rejecting to the collector for reflection therefrom at least 75% of the total thermal energy input to the absorber by thermal reemission therefrom.

2. A solar power production device for use in the presence of a design solar flux with orientation means adapted to orient said device with respect thereto, said device comprising:

a thermal absorber having an input area, a waste heat receiver, a heat engine in thermal contact with said absorber and said receiver and adapted to produce power thermodynamically by the transfer of heat energy from said absorber at a temperature $T_1$ to said receiver at a lesser temperature, a solar radiation concentrator having a focal position of maximum solar energy concentration, the concentration ratio at said focal position being C, said concentrator mounted to said absorber with said focal position at said input area, a retro-reflective structure mounted to said absorber about said input area but separated therefrom and positioned to return to said input area thermal radiation emitted therefrom and striking said retro-reflective structure, with $T_2$ the temperature of a black body emitting flux density equal to the average input flux density through said input area in the presence of said design solar flux for optimal orientation of said collector, said absorber and said engine constructed to safely operate with said absorber at a temperature greater than $T_2$ and with said $T_1$ greater than $0.85\ T_2$.

3. Apparatus as set forth in claim 2 wherein said heat engine comprises a thermionic emitter.

4. A device as set forth in claim 2 wherein said heat engine comprises a moving fluid thermal engine.

5. Apparatus as set forth in claim 2 wherein said retro-reflective structure comprises a segmental spherical reflector, internally reflective, and of high thermal conductivity, said segmental sphere being concentric with said entrance port.

6. Apparatus as set forth in claim 2 wherein said absorber is provided with an entrance port for radiation from said collector, and wherein said retro-reflective structure comprises an oblate spheroid concentric with said entrance port, the defining ellipse of said segmental oblate spheroid having focii lying on said entrance port, said spheroid being internally reflective and of high thermal conductivity.

7. Apparatus as set forth in claim 2 wherein said heat engine is adapted to operate at such heat input temperature as causes said absorber to reradiate at least 75% of the thermal energy supplied to it by said collector and said retro-reflector together.

8. Apparatus as set forth in claim 2 wherein said solar radiation collector is a paraboloidal reflector whose rim angle as seen from said absorber is substantially in the range of 30° to 45°.

References Cited
UNITED STATES PATENTS

| | | | |
|---|---|---|---|
| 1,424,932 | 8/1922 | Moreau | 60—26 X |
| 3,029,596 | 4/1962 | Hanold et al. | 60—24 |

OTHER REFERENCES

Aerospace Engineering, November 1960, pages 131, 132, 136, 140, 144, 146, 150, 154.

MARTIN P. SCHWADRON, *Primary Examiner.*
ROBERT R. BUNEVICH, *Examiner.*